United States Patent
Liebenow et al.

(10) Patent No.: US 6,909,424 B2
(45) Date of Patent: Jun. 21, 2005

(54) DIGITAL INFORMATION APPLIANCE INPUT DEVICE

(75) Inventors: Frank Liebenow, Dakota Dunes, SD (US); Stephen Vossler, Sioux Falls, SD (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 10/135,113

(22) Filed: Apr. 30, 2002

(65) Prior Publication Data

US 2002/0118175 A1 Aug. 29, 2002

Related U.S. Application Data

(62) Division of application No. 09/407,353, filed on Sep. 29, 1999, now abandoned.

(51) Int. Cl.[7] .................................................. G09G 5/00
(52) U.S. Cl. ........................ 345/169; 345/168; 345/173; 715/773
(58) Field of Search .................. 345/156, 168–170, 345/173, 705, 771, 773; 715/771, 773, 705

(56) References Cited

U.S. PATENT DOCUMENTS

| | | | | |
|---|---|---|---|---|
| 5,515,305 A | * | 5/1996 | Register et al. ............. | 708/145 |
| 5,936,614 A | * | 8/1999 | An et al. ..................... | 345/173 |
| 6,107,988 A | * | 8/2000 | Phillipps .................... | 345/156 |
| 6,121,960 A | * | 9/2000 | Carroll et al. .............. | 345/173 |
| 6,297,752 B1 | * | 10/2001 | Ni ............................... | 341/22 |

* cited by examiner

Primary Examiner—Ricardo Osorio
(74) Attorney, Agent, or Firm—Kevin West; Sutter-West-Swantz

(57) ABSTRACT

A digital information appliance comprises a housing having a display disposed on a first surface for displaying information to a user of the digital information appliance and an input device disposed on a second surface opposed to the first surface for imputing information. The input device is oriented with respect to the display so as to be operable by the fingers of the user's hand for input of information while holding the housing so the display is viewable.

24 Claims, 11 Drawing Sheets

DIGITAL INFORMATION APPLIANCE INPUT DEVICE

CROSS-REFERENCE TO RELATED APPLICATION

This is a Divisional of U.S. application Ser. No. 09/407,353, filed Sep. 29, 1999 now abandoned. Said U.S. application Ser. No. 09/407,383 is hereby incorporated herein by reference in its entirety.

FIELD OF THE INVENTION

The present invention relates generally to the field of digital information appliances, and more specifically to a digital information appliance comprised of a housing including generally opposed first and second surfaces wherein a display suitable for displaying information to a user is disposed on the first surface and an input device suitable for keyed input of information is disposed on the second surface. The present invention further relates to a method for aiding a user of such a digital information appliance in locating keys of the input device for entry of information.

BACKGROUND OF THE INVENTION

Digital information appliances such as electronic books, personal digital assistants (PDAs) and portable information handling systems are well know in the art for storage, manipulation and communication of information. For many digital information appliances (e.g., pen tablet type appliances such as PDAs, electronic books, etc.), it is desirable that appliance's housing have a compact, hand-held form-factor. As a result, such compact digital information appliances rarely include a keyboard or keypad, but instead rely on displays having touch sensitive panel overlays employing touch or pen input for entry and manipulation of information.

With the growing popularity of the Internet and similar network information services, compact digital information appliances will become increasingly common fixtures of everyday life. Unlike present stationary personal computers, compact digital information appliances do not constrain the user to a single location while accessing information via a network information service, but instead enable the user to freely roam throughout his or her home or office. However, because compact digital information appliances lack a keyboard, entry of information such as commands, electronic mail (e-mail) messages, and the like is inefficient, reducing the advantage gained from increased portability.

Consequently, there exists a need for a digital information appliance having a keyboard type input device positioned on the appliance's housing so that the size of the appliance is not substantially increased in comparison to a like digital information appliance without such an input device. It would be desirable to orient the input device with respect to the appliance's display to facilitate efficient entry of information by the user via methods such as touch-typing or the like. It would further be advantageous to provide a means of aiding the user in locating keys of the input device wherein the input device is not viewable by the user while typing so the user may more efficiently use the input device for entering information.

SUMMARY OF THE INVENTION

Accordingly, the present invention is directed to a digital information appliance comprised of a housing having a generally opposed first and second surfaces, a display for displaying information to users of the digital information appliance, and an input device for entry of information via keyed input. The display is disposed on the first surface so as to be generally faced toward a user holding the appliance while the input device is disposed on the second surface so as to face away from the user during use. The input device is preferably oriented with respect to the display so as to be operable by the fingers of the user's hand while holding the digital information appliance so the display may be viewed.

The present invention is further directed to a method of utilizing the digital information appliance of the present invention. In an exemplary embodiment, the method includes the steps of holding the digital information appliance so the display is viewable and the input device is positioned in a generally inverted orientation opposite the display wherein it is not viewable by the user, positioning a finger of the hand holding the digital information appliance over a key of the input device, and actuating the key to facilitate entry of information into the digital information appliance.

The present invention is further directed to a method of aiding a user in entering information into the digital information appliance. In an exemplary embodiment, the method comprises the step of displaying indicia on the display to help the user locate keys of the input device. The method may further include the steps of sensing the actuation of a key and advising the user that the key has been actuated. In an exemplary embodiment, the method may be implemented as a program of instructions storable on a medium readable by the digital information appliance for causing the appliance to perform the steps of the method.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
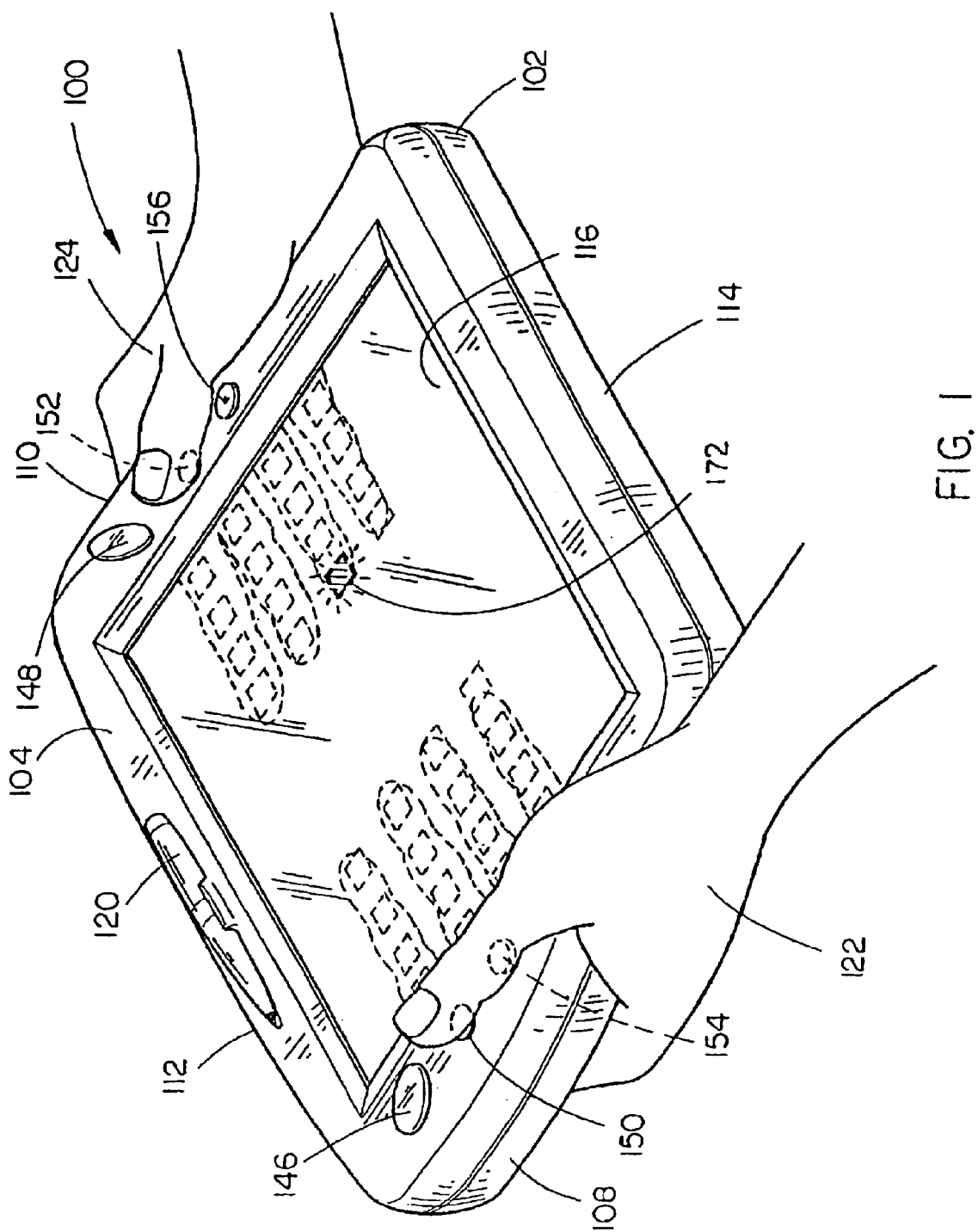
FIG. 1 is an isometric view of a digital information appliance in accordance with an exemplary embodiment of the present invention.

Referring now to FIGS. 1 though 6, a digital information appliance in accordance with an exemplary embodiment of the present invention is shown. The digital information appliance 100 is comprised of a housing 102 sized and shaped to be held by a user in both hands. In an exemplary embodiment, the housing 102 includes a front surface 104 and a back surface 106 wherein the front surface 104 is generally opposed to, i.e., faces away from, the back surface 106 as viewed by a user holding the digital information appliance 100. The housing 102 may further include left and right side surfaces 108 & 110 and top and bottom surfaces 112 & 114 joining the front surface 104 to the back surface 106 thereby providing an enclosure for the appliance's internal components.

A display 116 is mounted in the front surface 104 of the housing 102 for displaying information to users of the digital information appliance 100. The display 116 may comprise a liquid-crystal display (LCD), or may comprise an alternative type of display technology, such as a light-emitting diode (LED) display, light emitting polymer (LEP) display, field emission display (FED), gas or plasma display, or may comprise a cathode ray tube (CRT) display. A touch-sensitive panel (e.g., a touch-screen) 118 may overlay the display 116 for touch or pen input (via a pen or stylus 120) of information and data. Preferably, the touch sensitive panel overlay 118 is substantially transparent to allow information displayed via the display 116 to be viewed by the user.

During use, the digital information appliance 100 may be held by the user in both hands 122 & 124 so the display 116 is faced upward and viewable by the user, as shown in FIG. 1. When held in such a position, the user may grasp the housing 102 so the left and right side surfaces 108 & 110 fit within the palms of the user's left and right hands 122 & 124, respectively. In this manner, the fingers of the user's left and right hands 122 & 124 are positioned over the back surface 106 of the housing 102 while the thumbs are positioned over the front surface 104 along the left and right side surfaces 108 & 110 as shown in FIG. 1, or alternately, positioned along side surfaces 108 & 110.

Any or all of the front and back surfaces 104 & 106, the left and right side surfaces 108 & 110 and/or the top and bottom surfaces 112 & 114 may further be shaped to provide a comfortable gripping area for the user's hands 122 & 124. For instance, as shown in FIG. 1, left and right side surfaces 108 & 110 may be somewhat curved so the user may comfortably grasp the housing 102 in a natural holding position (e.g., as shown in FIG. 1). Further, it should be appreciated that the front and back surfaces 104 & 106, or any portion thereof, need not be parallel to each other as shown, but instead, may be faced away from each other at an angle or may be contoured so the housing 102 may be more comfortably held by the user.

An input device 130 is positioned on the housing's back surface 106 for entry of information via keyed input. The input device 130 is preferably oriented with respect to the display 116 so as to be operable by the fingers of the user's hands 122 & 124 while holding the digital information appliance 100 so the display 116 may be viewed (e.g., while holding the housing in the position shown in FIG. 1).

Figure 2:
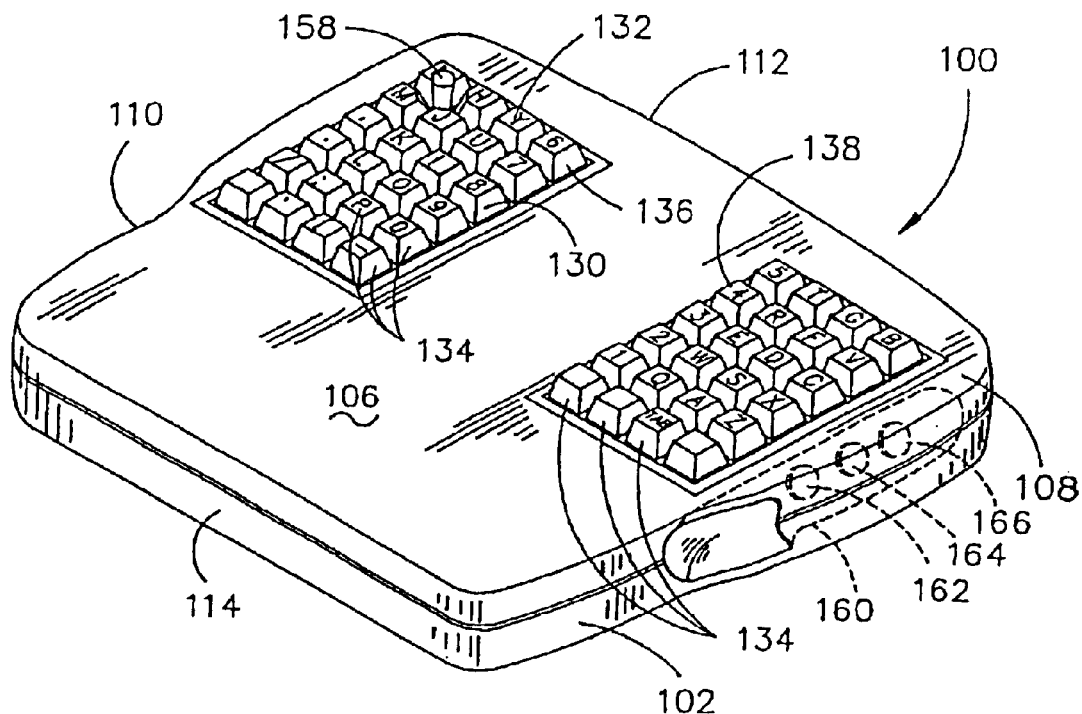
FIG. 2 is an isometric view of the back surface of the digital information appliance shown in FIG. 1, further illustrating an exemplary input device comprised of a keyboard split into left and right key ranges positioned and oriented so the user may type on the keyboard while viewing the display.
Figure 3:
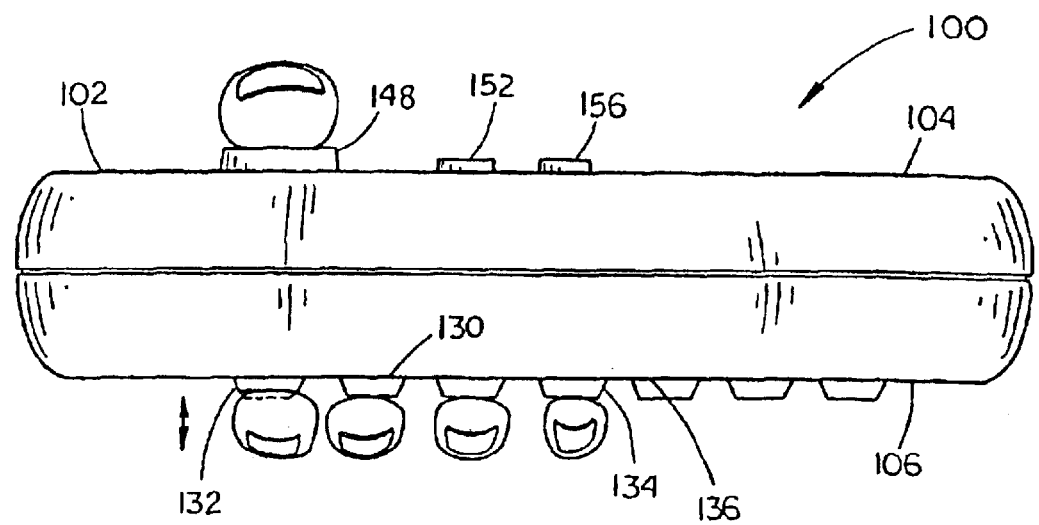
FIGS. 3 and 4 are partial cross-sectional side elevational views of the digital information appliance shown in FIGS. 1 and 2, wherein the keys of the left key range are omitted to further illustrate the position of the fingers of the user's hand during input of information via the keyboard.
Figure 4:
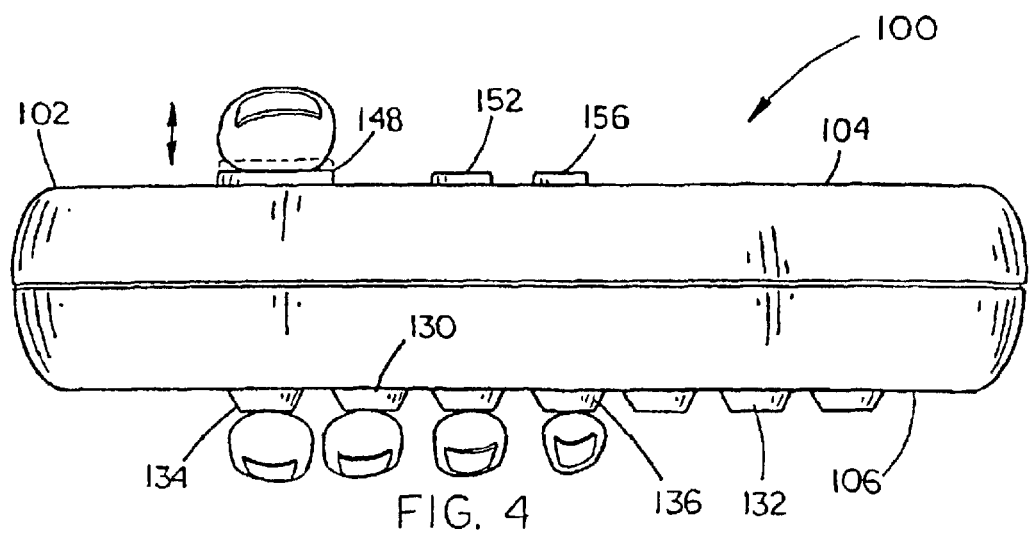

Turning now to FIGS. 2, 3 and 4, the input device 130 may be comprised of a keyboard 132 having a plurality of keys 134 generally arranged according to a standardized key configuration. As shown in FIG. 2, the keys 134 of the keyboard 132 may be divided into left and right key ranges 136 & 138 positioned adjacent to the left and right side surfaces 108 & 110, respectively, of the housing 102. In this manner, the fingers of the user's left and right hands 122 & 124 may be positioned over the keys 134 of each key range 136 & 138 in a manner allowing the user of conventional touch-typing techniques.

In an exemplary embodiment, the keys 134 of the keyboard 132 may be generally ordered in accordance with the QWERTY standard key configuration currently utilized by most conventional typewriter and computer keyboards. However, as shown in FIG. 2, the keys normally typed by the left hand when utilizing conventional touch-typing techniques (i.e., keys "Z", "A", "Q", "1", "X", "S", "W", "2", "C", "D", "E", "3", "V", "F", "R", "4", "B", "G", "T", "5", etc.) are grouped in the left key range 136 while the keys 134 normally typed by the right hand (i.e., keys "6", "Y", "H", "N", "7", "U", "J", "M", "8", "I", "K", ",", "9", "O", "L", ".", "0", "P", ";", "/", "-", "[", """, etc.) are grouped in the right key range 138. Further, the keys 134 of each key range 136 & 138 are rotated and positioned so as to be in the expected location relative to the other keys of the keyboard and the user's fingertips for touch-typing. Thus, the first or bottom row of keys of the left key range (i.e., the row including the "Z", "X", "C", "V" and "B" keys) is closest to the left side surface 108 of the housing 102. The second row of keys, usually referred to as the "home" row (e.g., the row including the "A", "S", "D", "F" and "G" keys) is positioned adjacent to the first row, the third row (e.g., the row including the "Q", "W", "E", "R" and "T" keys) is positioned adjacent to the second row, and the top row (e.g., the row including the "1", "2", "3", "4" and "5" keys) is positioned adjacent to the third row and farthest from the left side surface 108. Similarly, the first or bottom row of keys of the right key range (i.e., the row including the "N", "M", ",", "." and "/" keys) is placed closest to the right side surface 110 of the housing 102. The second or "home" row of keys (e.g., the row including the "H", "J", "K", "L" keys) is positioned next to the first row, the third row (e.g., the row including the "Y", "U", "I", "O", and "P" keys) is placed next to the second row, and the top row (e.g., the row including the "6", "7", "8", "9", and "0" keys) is placed farthest from the right side surface 110.

The digital information appliance may further include a cursor control device such as a cursor control stick, touchpad, trackball, microball, or the like. The cursor control device is preferably disposed on the back surface 106 of the digital information appliance's housing 102 so that it may be operably controlled by the user's fingertip. However, the cursor control device may alternately be disposed on the front or side surfaces 104, 108 & 110 of the housing 102 so as to be operably controlled by the user's thumb. For example, as shown in FIG. 2, a cursor control stick 158 may be disposed among the keys 134 of keyboard 132. In FIG. 2, the cursor control stick 158 is shown positioned between the "N", "H", "M" and "J" keys of keyboard 132. This location, which is near the home typing row, is advantageous because it allows a user to conveniently manipulate the cursor control stick 158 using the index finger from a normal typing position. It should however be appreciated that while the location of cursor control stick 158 shown herein is preferred, the cursor control stick 158 may alternately be positioned elsewhere within keyboard 132, or mounted elsewhere on the housing 102 of digital information appliance 100 without departing from the scope and spirit of the present invention.

As shown in FIGS. 1, 3 and 4, one or more keys 146, 148, 150, 152, 154 & 156 may be mounted on the front surface 104 of the housing 102 so as to be actuated, e.g., depressed and released, by the thumbs of the user's left and right hands 122 & 124. In an exemplary embodiment, one or more of the keys may correspond to the keys of a conventional QWERTY keyboard that are normally actuated by the thumbs. For instance, keys 146 & 148 may provide the "space bar"for keyboard 132. Similarly, other front surface mounted keys 150, 152, 154 & 156 may act as combination function keys (e.g., "Ctrl", "Alt", "Shift", etc.). Such keys provide a function when depressed in conjunction with another key of the keyboard. Alternately, one or more of the front surface mounted keys 150, 152, 154 & 156 may function as a conventional "ENTER" key to accept or execute entry of information inputted or typed via the keyboard 132. In one embodiment, information inputted via the keyboard 132 may be displayed on the display 116 as it is typed. Wherein the user determines that the information is correctly typed, the "ENTER" key may be depressed to accept the information and execute its entry. Keys 150, 152, 154 & 156 may further be utilized in conjunction with a cursor control device such as cursor control stick 158 (FIG. 2) to emulate the buttons of a conventional computer mouse to provide user input for software employing a graphical user interface (GUI). In this manner, the cursor control stick 158 and keys 150, 152, 154 & 156 may be used to accomplish such actions as "pressing"or "clicking" on-screen "buttons" in dialog boxes, choosing menu items, or the like.

Alternately, the thumbs of the user's left and right hands may be positioned along side surfaces 108 & 110 of the digital information appliance's housing 102 during use. For instance, as shown in FIG. 2, the user's thumbs may be inserted within cavities 160 formed in the left and right side surfaces 108 & 110 of the housing 102. The cavities 160 function as aid in supporting the digital information appliance 100 while typing. One or more keys 162, 164 & 166 may be positioned within one or both cavities 160 so the user may actuate, e.g., depress and release, them using his or her thumb(s). In embodiments of the invention, these keys 162, 164 & 166 may function as keys of a conventional QWERTY keyboard that are normally actuated by the thumbs such as the "space bar", as combination function keys (e.g., "Ctrl", "Alt", "Shift", etc.), as a conventional "ENTER" key to accept or execute entry of information inputted or typed via the keyboard 132, in conjunction with a cursor control device such as cursor control stick 158 (FIG. 2) to emulate the buttons of a conventional computer mouse, or may provide application specified or user defined functions.

In the exemplary embodiment shown in FIGS. 1, 2, 3 and 4, keys 134, 146, 148, 150, 152, 154, 156, 162, 164 & 166 maybe comprised of a keycap, a tension mechanism for suspending the keycap and allowing it to be actuated (i.e., depressed), and an electronic assembly that records the key press and key release. It should however be appreciated that other key structures may be utilized. For instance, each key may be comprised of a touch sensitive surface. Further, although a keyboard 132 having a QWERTY key configuration is described in the exemplary embodiment, it should be appreciated that the keyboard 132 of the present invention may utilize other key configurations such as the Dvorak key configuration, a non-English language key configuration, a user or manufacturer defined key configuration, etc. Like the QWERTY key configuration, keyboards employing such alternative key configurations may be split into left and right key ranges to facilitate typing in an inverted orientation.

Figure 5:
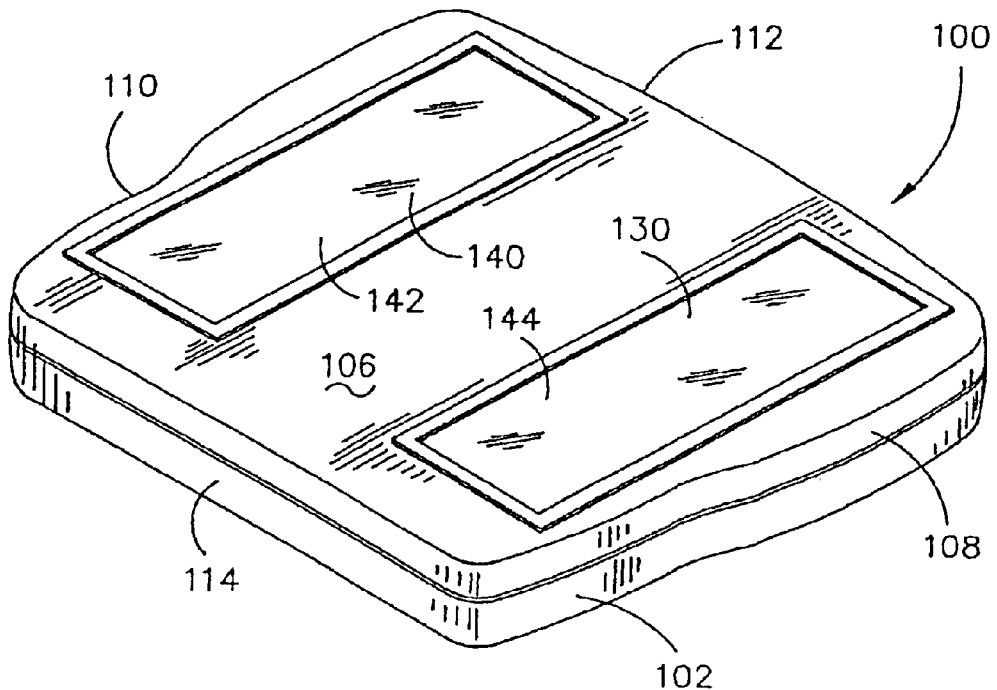
FIG. 5 is an isometric view of the back surface of the digital information appliance shown in FIG. 1, further illustrating an exemplary input device comprised of one or more touch sensitive panels.

Turning now to FIG. 5, an exemplary input device 130 may alternately be comprised of one or more touch sensitive panels 140. Areas of the touch sensitive panel 140 may be defined as keys of a keyboard so that a user touching the panel within such an area would accomplish an actuation of the key. In this manner, the touch sensitive panels may emulate an electromechanical keyboard such as keyboard 132 shown in FIG. 2. Like keyboard 132, the touch sensitive panel 140 may be divided into left and right key ranges 142 & 144 positioned adjacent to the left and right side surfaces 108 & 110, respectively, of the housing 102. In this manner, the fingers of the user's left and right hands 122 & 124 may be properly positioned over the touch sensitive panel 140 so as to be in the proper position for supporting conventional touch typing techniques. Further, since the keyboard is emulated, various key configurations may be defined as desired by the user or as required by the applications executed by digital information appliance. For instance, the left and right key ranges 142 & 144 may be defined to emulate the divided QWERTY keyboard 132 illustrated in FIGS. 2 through 4. Alternately, the key ranges 142 & 144 may be defined to provide alternate key configurations such as a Dvorak key configuration, a non-English language key configuration, a numeric keypad configuration, a telephone keypad configuration, or a user or application specified key configuration (see FIGS. 15 and 16). Exemplary apparatus and methods for providing configurable keyboards utilizing touch sensitive panels are described in commonly owned U.S. patent application Ser. No. 09/346,777 which is herein incorporated by reference in its entirety.

In an exemplary embodiment, the touch sensitive panel 140 may comprise a resistive touch pad suitable for generating an analog signal proportional to the amount of pressure applied by the user's fingertips. This analog signal may be converted to a digital signal via an analog to digital converter (ADC) for processing by the digital information appliance's processor (see FIG. 14). Such resistive touch pads have conventionally been utilized to allow the user to select a point on the display 116 by either tapping or applying an added downward pressure to the surface of the touch pad. In the present invention, such resistive touch pads would allow the user to rest his or her fingertips on the pad's surface without inadvertently actuating a key. The touch pad could then sense an increase in pressure applied to its surface as the user attempts to actuate a key. This increase in pressure would be registered as a key press, and the information corresponding to that key (i.e., the character or function) would be entered.

Alternately, the touch sensitive panel 140 may utilize other touch pad technologies. For instance, the touch sensitive panel 140 may be comprised of a capacitive touch pad capable of sensing variations in applied pressure by measuring the area of the user's finger tip in contact with the surface of the pad. Similarly, the touch sensitive panel 140 may be comprised of touch pads employing electromagnetic radiation (e.g., infrared (IR) radiation) or ultrasonic technologies. For instance, the digital information appliance 100 may employ a "virtual" keyboard wherein electromagnetic radiation forms a planer field over the back surface 106 of the digital information appliance. A user may then actuate a key of the "virtual" keyboard by breaking the planer field in a defined position. Exemplary "virtual" keyboard technologies are described in greater detail in commonly owned U.S. patent application Ser. No. 09/350,572 which is herein incorporated by reference in its entirety.

Figure 6:
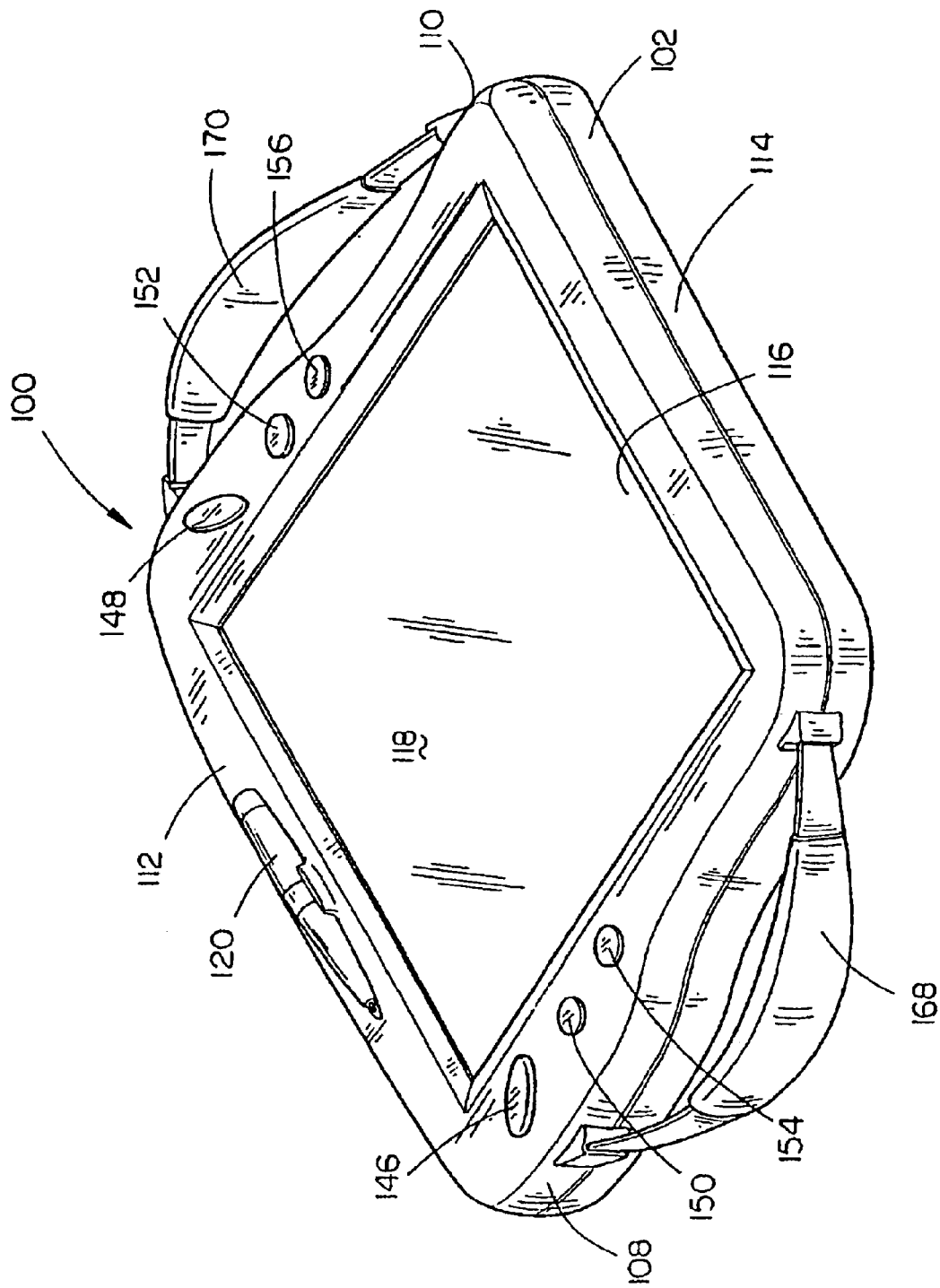
FIG. 6 is an isometric view of the digital information appliance shown in FIGS. 1 through 5, wherein the housing of the appliance is further provided with gripping aids to assist the user in holding the appliance while typing.

Turning now to FIG. 6, the digital information appliance 100 shown in FIG. 1, may further include one or more gripping aids for assisting the user in holding the housing 102 while typing information into the input device (e.g., keyboard, touch sensitive panel, etc.). In the exemplary embodiment shown in FIG. 6, the gripping aids may be comprised of left and right hand straps 158 & 160 affixed to the left and right side surfaces 108 & 110 of the housing 102. The user may insert a hand 122 & 124 through each hand strap 168 & 170 so the hand strap 168 & 170 extends between the thumb and index finger, thereby wrapping around the back of the hand 122 & 124. Preferably, the hand straps 158 & 160 are positioned to support the digital information appliance 100 from the back of the hands 122 & 124 thereby freeing the user's fingers and thumbs for entry of information via the input device.

Figure 7:
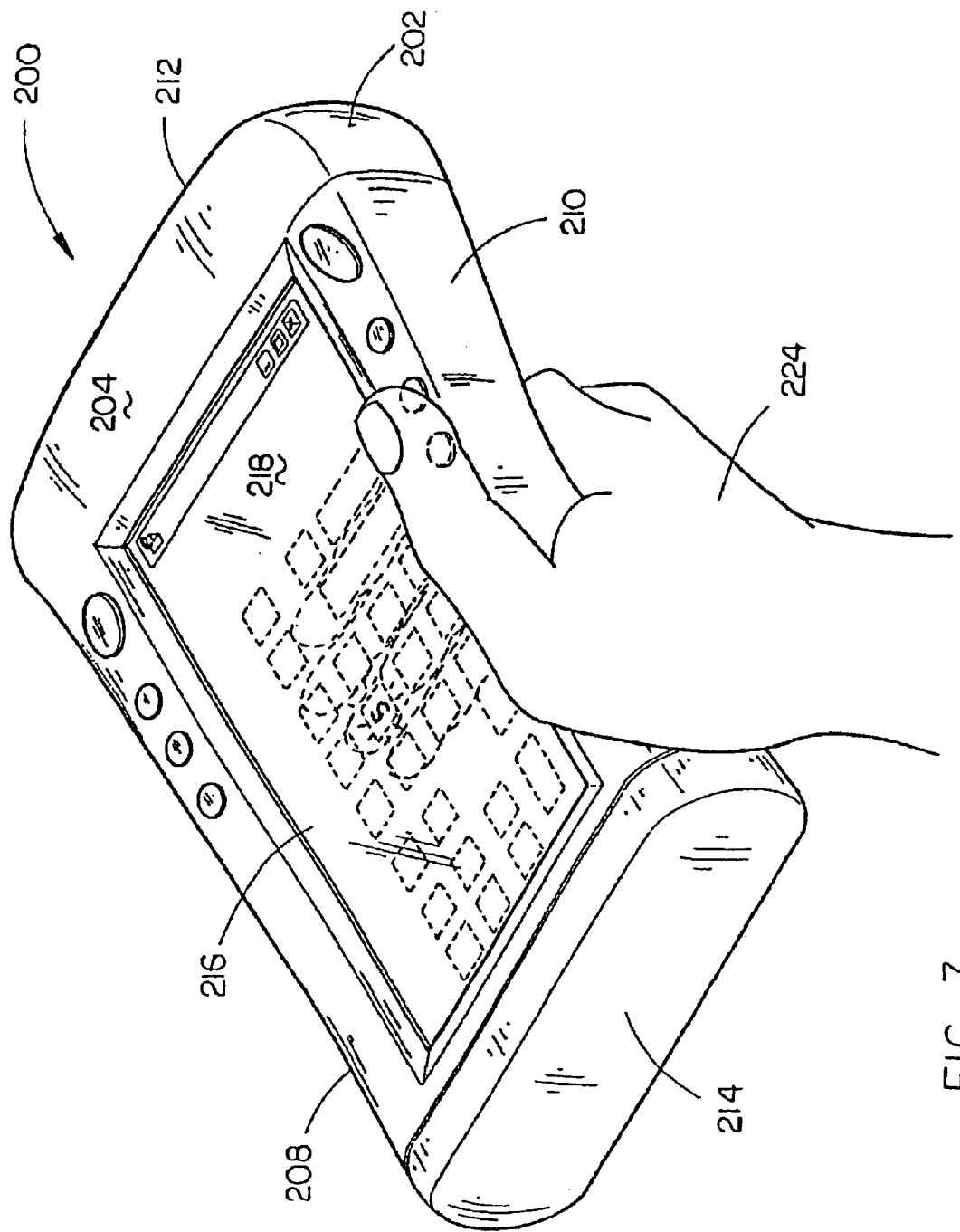
FIG. 7 is an isometric view of a digital information appliance in accordance with a second exemplary embodiment of the present invention.
Figure 9:
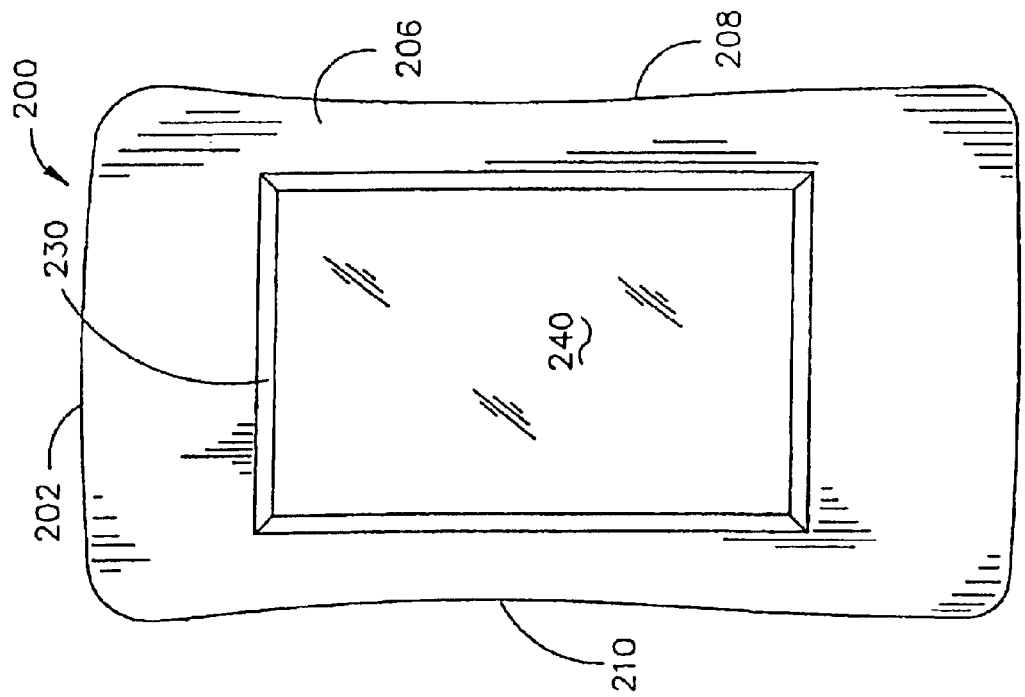
FIG. 9 is a view of the back surface of the digital information appliance shown in FIG. 7, further illustrating an exemplary input device comprising one or more touch sensitive panels.
Figure 8:
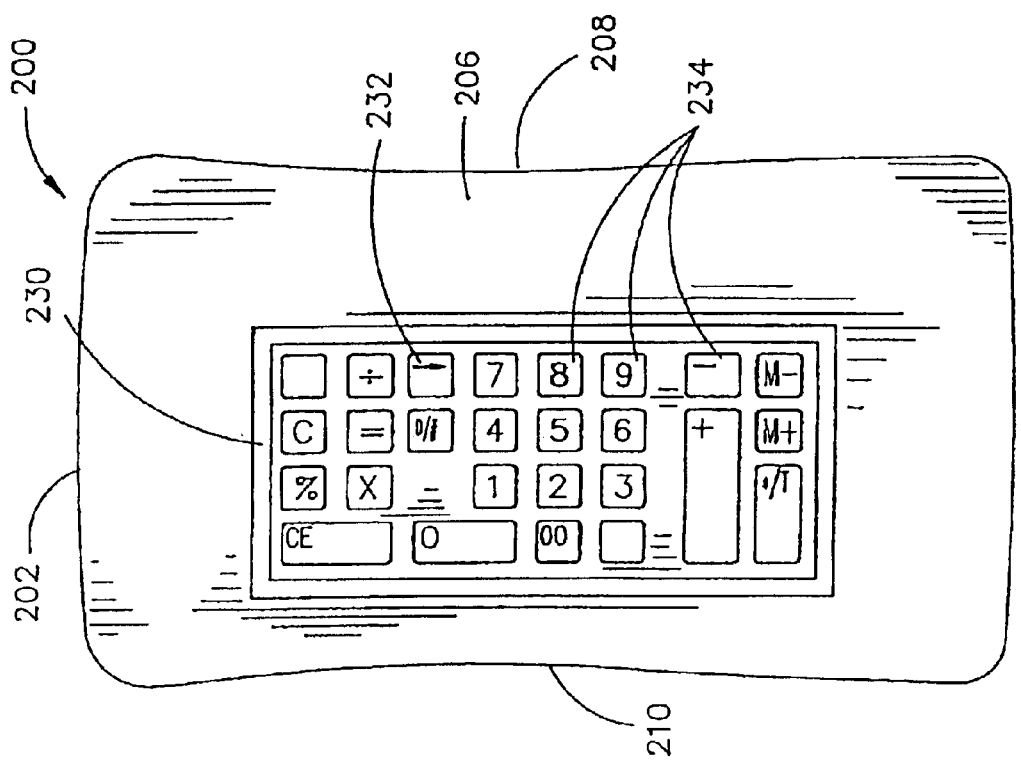
FIG. 8 is a view of the back surface of the digital information appliance shown in FIG. 7, further illustrating an exemplary input device comprising a keypad positioned and oriented so the user may type on the keypad while viewing the display.

Referring now to FIGS. 7, 8 and 9, a digital information appliance in accordance with a second exemplary embodiment of the present invention is shown. As shown in FIG. 7, the digital information appliance 200 is comprised of a housing 202 sized and shaped to be held by a user in one hand. Like the digital information appliance 100 shown in FIGS. 1 through 6, the digital information appliance 200 shown in FIGS. 7, 8 and 9, is comprised of a housing 202 having a front surface 204 and a back surface 206 wherein the front surface 204 is generally opposed to, i.e., faces away from, the back surface 206 as viewed by a user holding the digital information appliance 200. The housing 202 further includes left and right side surfaces 208 & 210 and top and bottom surfaces 212 & 214 joining the front surface 204 to the back surface 206.

During use, the digital information appliance 200 may be held by the user in either the left or right hand 224 so the display 216 mounted on the front surface 204 is faced upward and viewable by the user, as shown in FIG. 8. In such a natural holding position, the user may grasp the housing 202 so one of the top, bottom or side surfaces 208, 210, 212, or 214 fits within the palm of the hand 224. In this manner, the fingers of the user's hand 224 are positioned over the back surface 206 of the housing 202 while the thumb is positioned over the front surface 204, or, alternately, along a top, bottom or side surface 208, 210, 212 or 214. Like the digital information appliance 100 shown in FIGS. 1 through 6, any or all of the front and back surfaces 204 & 206, the left and right side surfaces 208 & 210 and/or the top and bottom surfaces 212 & 214 may be contoured to provide a comfortable gripping area for the user's hands 224. Further, it should be appreciated that the front and back surfaces 204 & 206, or any portion thereof, need not be parallel to each other, but instead, may be face away from each other at an angle. As shown in FIG. 8, the digital appliance 200 may be suitable for both left or right handed operation. Alternately, as shown in FIG. 9, the appliance 200 may be specifically adapted for left or right handed operation only, depending on the requirements of the user (e.g., whether the user is left handed or right handed).

Turning now to FIGS. 8 and 9, an input device 230 is positioned on the back surface 206 of the housing 202 and oriented with respect to the display 116 so as to be operable while the user is holding the housing so the display may be viewed (e.g., while holding the housing in the position shown in FIG. 7).

As shown in FIG. 8, the input device 230 may be comprised of a keypad 232 having a plurality of alphanumeric and/or function keys 234 that may be actuated by the user, i.e., depressed and released, for entering information into the digital information appliance 200. In an exemplary embodiment, the keys 234 are oriented so the user may enter information in an inverted orientation (i.e., while the digital information 200 appliance is held in the position shown in FIG. 7). For instance, as shown in FIG. 8, for a user desiring to hold the appliance in his or her right hand, the keypad 232 may be rotated so that the bottom row of keys of the keypad 232 is adjacent to right side surface 208 of the housing 202. Alternately, for users desiring to hold the digital information in the left hand, the keypad 232 may be rotated so the bottom row of keys of the keypad 232 is adjacent to the left side surface 210 of the housing 202.

As shown in FIG. 9, the input device 230 may alternately be comprised of a touch sensitive panel 240. Such a touch sensitive panel 240 may utilize resistive, capacitive electromagnetic or ultrasonic touch pad technologies described in the discussion of FIG. 5. Areas of the touch sensitive panel 240 may be defined as keys of a keypad so that a user touching the panel 240 within such an area would accomplish an actuation of the key. In this manner, the touch sensitive panels may emulate an electromechanical keypad such as keypad 232 shown in FIG. 8. Further, various key configurations may be defined as desired by the user or as required by the applications executed by digital information appliance 200. For instance, the areas of the touch sensitive panel 240 may be defined to emulate a numeric (e.g., calculator) keypad 232 as shown in FIGS. 7 and 8. Alternately, areas of the touch sensitive panel 240 may be defined to provide key configurations such as a telephone keypad, or an application specific or user defined key configuration. As discussed supra, exemplary apparatus and methods for providing configurable keyboards utilizing touch sensitive panels are described in commonly owned U.S. patent application Ser. No. 09/346,777 which is herein incorporated by reference in its entirety.

Figure 10:
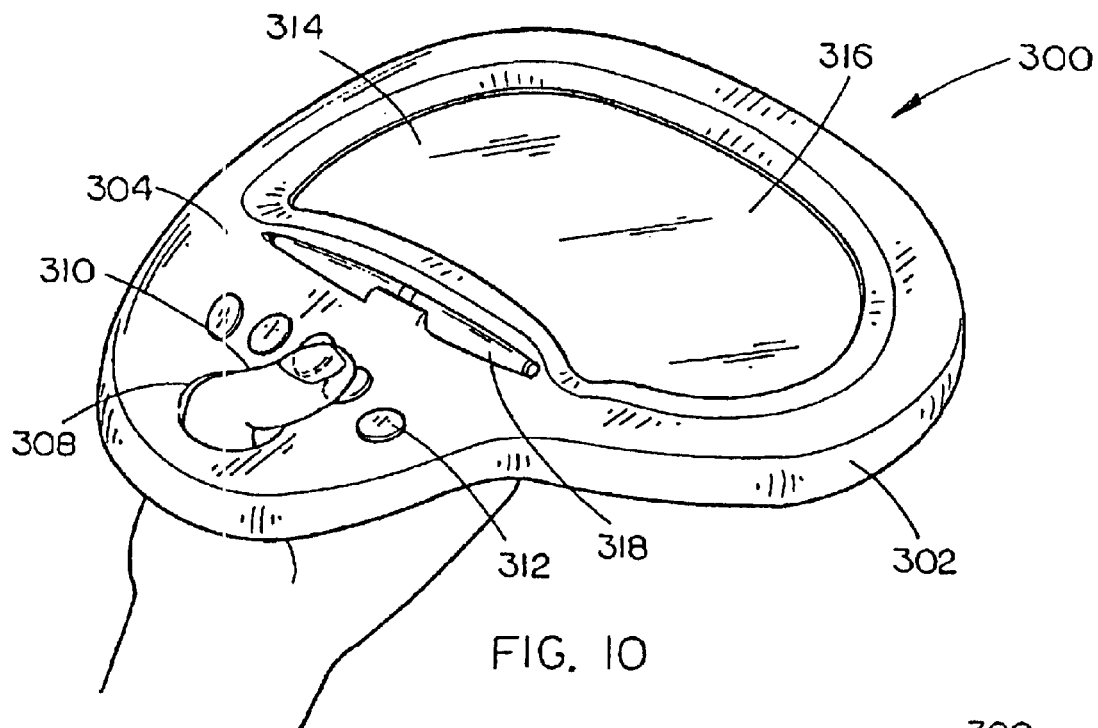
FIG. 10 is an isometric view of a digital information appliance in accordance with a third exemplary embodiment of the present invention.
Figure 11:
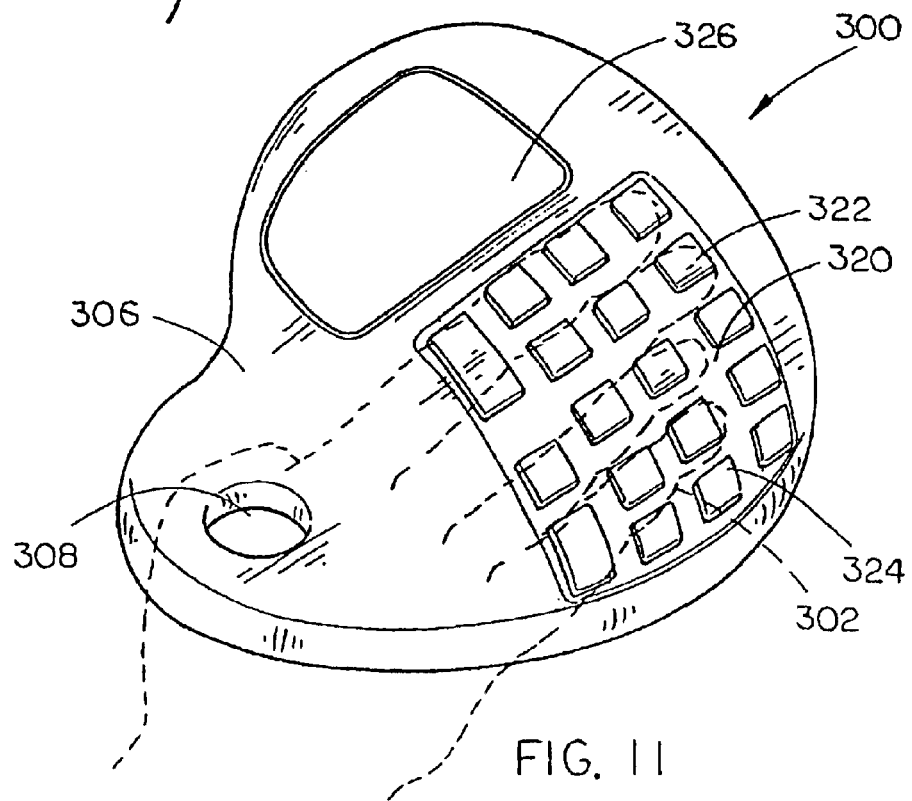
FIG. 11 is a view of the back surface of the digital information appliance shown in FIG. 10.

Referring now to FIGS. 10 and 11, a digital information appliance in accordance with a further exemplary embodiment of the present invention is shown. Like the digital information appliance 200 shown in FIGS. 7 through 9, the digital information appliance 300 shown in FIGS. 10 and 11, includes a housing 302 sized to be held by a user in one hand, and having a front surface 304 and a back surface 306 wherein the front surface 304 is generally opposed to, i.e., faces away from, the back surface 306 as viewed by a user holding the digital information appliance 300. However, as shown in FIG. 10, the housing 302 of the digital information appliance 300 is further flattened and may have a generally curved shape much like that of a conventional painter's pallet. An aperture 308 extends through the housing 302 near a lower end of the housing through which user may extend his or her thumb 310. One or more keys 312 may be disposed on the front surface 304 near the aperture 308. Preferably, keys 312 are positioned so they may be actuated by the thumb 310 of the user's hand while holding the digital information appliance, i.e., while the thumb 310 is extended through the aperture 308.

A display 314 is mounted in the front surface 304 of the housing 302 for displaying information to users of the digital information appliance 300. The display 314 may comprise a liquid-crystal display (LCD), or may comprise an alternative type of display technology, such as a light-emitting diode (LED) display, light emitting polymer (LEP) display, field emission display (FED), gas or plasma display, or may comprise a cathode ray tube (CRT) display. A touch-sensitive panel (e.g., a touch-screen) 316 may overlay the display 314 for touch or pen input (via a pen or stylus 318) of information and data. Preferably, the touch sensitive panel overlay 316 is substantially transparent to allow information displayed via the display 116 to be viewed by the user.

As shown in FIG. 11, an input device 320 is positioned on the back surface 306 of the housing 302 and oriented with respect to the display 314 so as to be operable while the user is holding the housing 302 so the display 314 may be viewed (e.g., while holding the housing 302 in the position shown in FIG. 10). In an exemplary embodiment, the input device 320 may be comprised of a keypad 322 having a plurality of alphanumeric and/or function keys 324 that may be actuated by the user, i.e., depressed and released, for entering information into the digital information appliance 300. Preferably, these keys 324 are oriented so the user may enter information in an inverted orientation (i.e., while the digital information 300 appliance is held in the position shown in FIG. 10). For instance, as shown in FIG. 11, the keys 324 of keypad 322 may be arranged in a semicircular or fan shape so they may be reached by the fingers of the user's hand while holding the digital information appliance 300 as shown in FIG. 10.

Alternately, the input device 320 may be comprised of a touch sensitive panel (not shown). Areas of the touch sensitive panel may be defined as keys of a keypad so that a user touching the panel within such an area would accomplish an actuation of the key. In this manner, the touch sensitive panels may emulate an electromechanical keypad such as keypad 322 shown in FIG. 11. Further, areas of the touch sensitive panel may be defined to provide a variety of key configurations such as, for example, configuration that are application specific or are defined by a user. As discussed supra, exemplary apparatus and methods for providing configurable keyboards utilizing touch sensitive panels are described in commonly owned U.S. patent application Ser. No. 09/346,777 which is herein incorporated by reference in its entirety.

As shown in FIG. 11, the digital information appliance further includes a cursor control device 326 (a touchpad is shown). Preferably, the cursor control device 326 is disposed on the back surface 306 of the digital information appliance's housing 302 so that it may be operably controlled by a fingertip of the user's hand. However, the cursor control device 326 may alternately be disposed on the front surface 304 of the housing 302 so as to be operably controlled by the user's thumb 310.

The digital information appliance 300 shown in FIGS. 10 and 11 is configured for use by a person desiring to hold the digital information appliance 300 in his or her left hand (e.g., a right handed person who wishes to hold the digital information appliance in his or her left hand so his or her right hand is free for input of information via the touch sensitive panel overlay 316). However it will be appreciated that the digital information appliance 300 may alternately be configured for use by those desiring to hold the digital information appliance 300 in the right hand (e.g., a left handed person) or by or either right or left hand.

During use, the digital information appliance 300 may be held by the user in his or her hand so the display 314 mounted on the front surface 304 is faced upward and viewable by the user, as shown in FIG. 10. The thumb 310 of the user's hand is extended though the aperture 308 thereby aiding the user in supporting the digital information appliance 300 with one hand and allowing the user to actuate keys 312. The fingers 328 of the user's hand are positioned over the back surface 306 so that the user may actuate keys 324 of keypad 322 or cursor control device 326. In an exemplary embodiment, the digital information appliance 300 may be configured for use with an information network such as the Internet. In such an embodiment, keys 312 may provide browsing functions for browsing content pages within the network such as "Back" and "Forward" for navigating among content pages, "Stop" for stopping the display of incoming content, "Refresh" for reloading a content page, "Home" for returning to a home page from a content page, and the like, "Search" for invoking a network search engine, and the like.

In FIGS. 1 through 11, hand-held digital information appliances 100, 200 & 300 are shown. However, it should be appreciated that digital information appliances in accordance with the present invention are not limited to being hand-held but instead may be mounted to fixtures such as stand or pedestal, or supported on surfaces such as tabletops, walls and the like.

Figure 12:
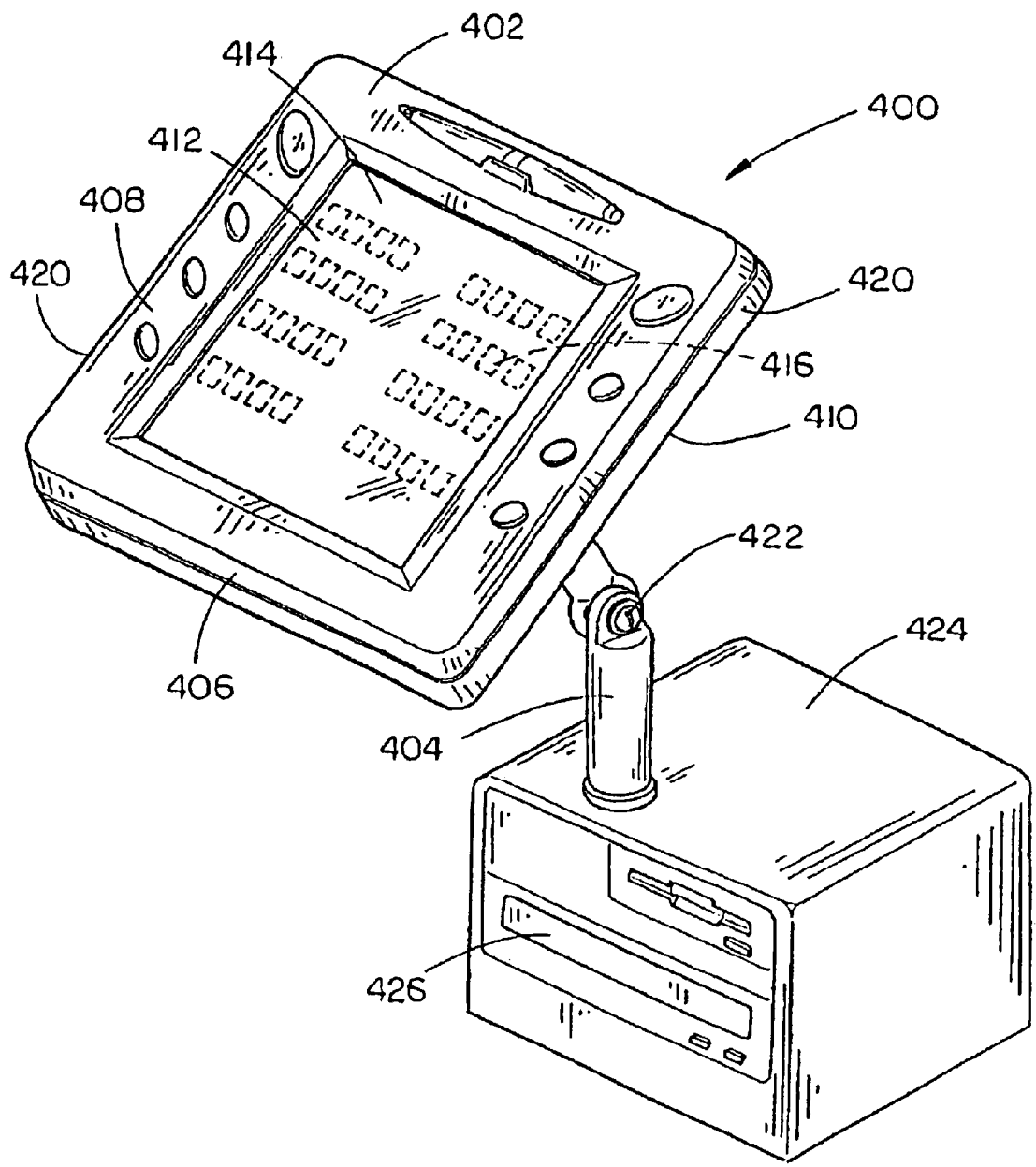
FIG. 12 is an isometric view of an exemplary digital information appliance wherein the digital information appliance is mounted to a support during use.

Referring now to FIG. 12, an exemplary fixture mounted digital information appliance is described. The digital information appliance 400 is comprised of an appliance portion 402 and a support 404 such as a stand or pedestal for supporting the appliance portion 402. The appliance portion 402, like the digital information appliances 100, 200 & 300 of FIGS. 1 through 11, is comprised of a housing 406 having a front surface 408 and a back surface 410 wherein the front surface 408 is generally opposed to, i.e., faces away from, the back surface 410 as viewed by a user of the digital information appliance 400. A display 412 is mounted in the front surface 408 of the housing 406 for displaying information to users of the digital information appliance 400. The display 412 may comprise a liquid-crystal display (LCD), or may comprise an alternative type of display technology, such as a light-emitting diode (LED) display, light emitting polymer (LEP) display, field emission display (FED), gas or plasma display, or may comprise a cathode ray tube (CRT) display. A touch-sensitive panel 414 may overlay the display 412 for touch or pen input of information and data.

In accordance with the present invention, an input device 416 such as a keyboard, keypad or touch sensitive panel as described in the discussion of digital information appliances 100, 200 & 300 (FIGS. 1 through 11) is disposed on the back surface 410 of the housing 406 and oriented with respect to the display 412 so as to be operable by a user while viewing the display 412. During use, the appliance portion 402 is supported by support 404 so the display 412 is faced upward and viewable by the user, as shown in FIG. 12. The appliance portion 402 is grasped or held by a user in one or both hands so his or her fingers are positioned over the input device 416 while the thumbs are positioned over the front surface 408, or alternately, along side surfaces 418 & 420 thereby allowing entry of information via the input device 416.

In exemplary embodiments of the invention, support 404 may include a pivot 422 or like device for adjusting the orientation of the appliance portion 402 with respect to the user. In this manner, the position of the appliance portion 402 may be changed (e.g., tilted or rotated) to provide a more comfortable holding position for the user. Further, the support 404 may include provisions for mounting peripheral devices 426 usable with the digital information appliance 400. For example, in an exemplary embodiment, the support 404 may include one or more bays 424 suitable for holding common accessory devices 426 such as hard disk drives, floptical disk drives, optical (CD-ROM, DVD etc.) disc drives, printers, optical indicia readers, and the like. These peripheral devices 426 may be operably coupled with the appliance portion 402 via wiring or cabling contained within the support 404 (not shown).

Figure 13:
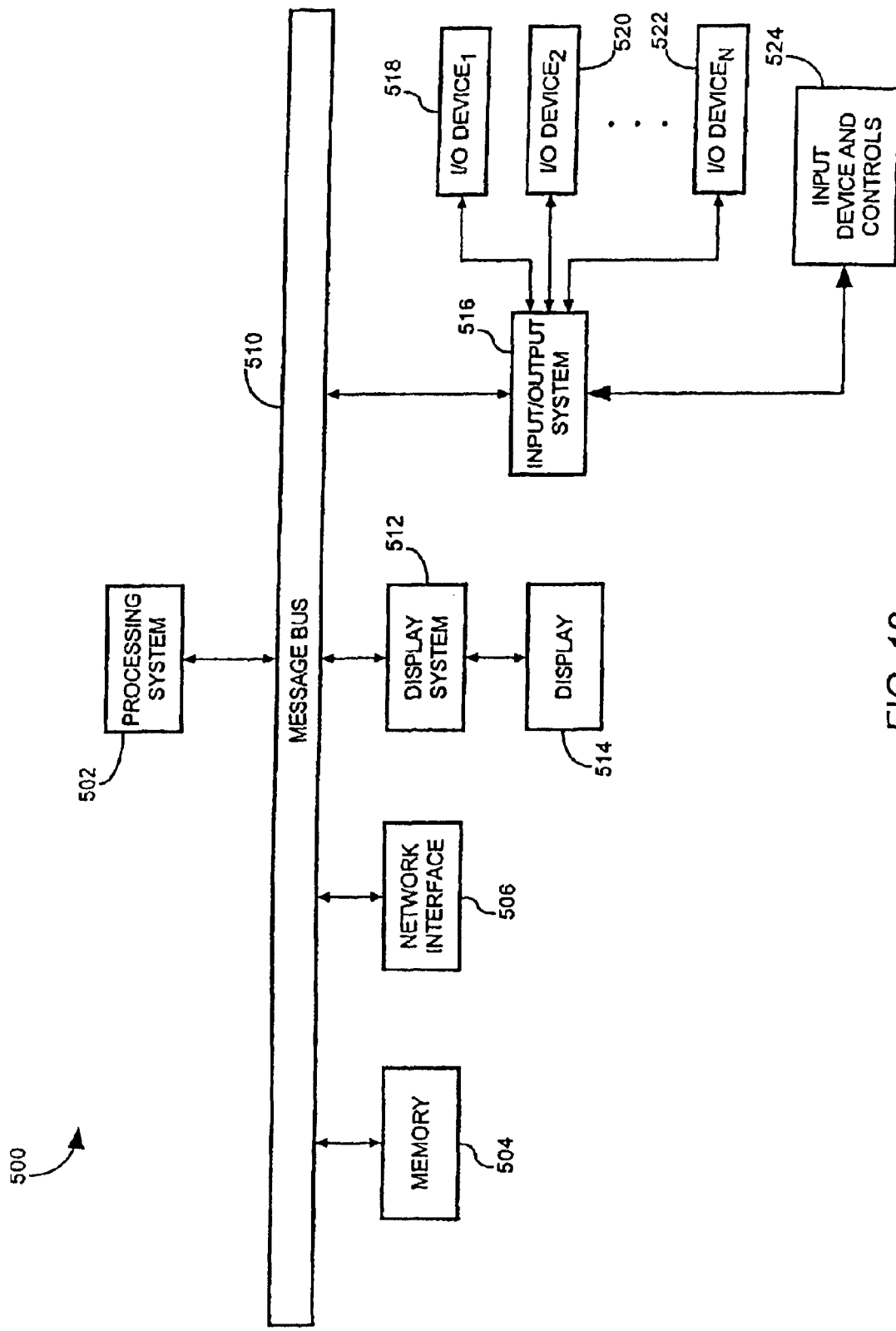
FIG. 13 is a block diagram depicting the hardware architecture of a digital information appliance in accordance with an exemplary embodiment of the present invention.

Referring now to FIG. 13, a hardware system in accordance with the present invention is shown. The hardware system shown in FIG. 13 is generally representative of the hardware architecture of the digital information appliances of the present invention. A controller, for example, a processing system 502, controls the digital information appliance 500. The processing system 502 includes a central processing unit such as a microprocessor or microcontroller for executing programs, performing data manipulations and controlling the tasks of the digital information appliance 500. Communication with the processing system 502 may be implemented through a system bus 510 for transferring information among the components of the digital information appliance 500. The system bus 510 may include a data channel for facilitating information transfer between storage and other peripheral components of the digital information appliance 500. The system bus 510 further provides the set of signals required for communication with processing system 502 including a data bus, address bus, and control bus. The system bus 510 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S- 600, and so on. Furthermore, the system bus 510 may be compliant with any promulgated industry standard. For example, the system bus 510 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access bus, IEEE P6394, Apple Desktop Bus (ADB), Concentration Highway Interface (CHI), Fire Wire, Geo Port, or Small Computer Systems Interface (SCSI), for example.

Additionally, the digital information appliance 500 includes a memory 504. In one embodiment, the memory 504 is provided on SIMMs (Single In-line Memory Modules), while in another embodiment, memory 504 is provided on DIMMs (Dual In-line Memory Modules), each of which plugs into suitable sockets provided on a motherboard holding many of the other components shown in FIG. 10. Memory 504 includes standard DRAM (Dynamic Random Access Memory), EDO (Extended Data Out) DRAM, SDRAM (Synchronous DRAM), or other suitable memory technology. Memory 504 may also include auxiliary memory to provide storage of instructions and data that are loaded into the memory 504 before execution. Auxiliary memory may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM).

Exemplary memory 504 may further be provided by a hard disk drive (HDD) such as a micro HDD developed by International Business Machines, Inc. (IBM) or removable media such as a magnetic disk or optical disc devices, a removable micro HDD, or the like. Memory 504 may also be provided remotely by a peripheral device such as an accessory HDD, or a by a remote information handling system, server or digital information appliance via a network.

The digital information appliance 500 further includes a network interface 506. The network interface 506 communicates between the digital information appliance 500 and a remote device, such as external devices, networks, information sources, or host systems that administer a plurality of digital information appliances and/or information handling systems. For example, host systems such as a server or information handling system, may run software controlling the digital information appliance 500, serve as storage for a digital information appliance 500, or coordinate software running separately on each digital information appliance 500. The network interface 506 may provide or receive analog, digital, or radio frequency data. The network interface system 506 preferably implements industry promulgated architecture standards, including Recommended Standard 232 (RS-232) promulgated by the Electrical Industries Association, Infrared Data Association (IrDA) standards, Ethernet IEEE 802 standards (e.g., IEEE802.3 for broadband and baseband networks, IEEE 802.3z for Gigabit Ethernet, IEEE802.4 for token passing bus networks, IEEE802.5 for token ring networks, IEEE802.6 for metropolitan area networks, 802.66 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Universal Serial Bus (USB), and so on. For example, the network interface system 506 may comprise a network adapter, a serial port, parallel port, printer adapter, modem, universal asynchronous receiver-transmitter (UART) port, etc., or use various wireless technologies or links such as an infrared port, radio-frequency (RF) communications adapter, infrared transducers, or RF modem.

The digital information appliance 500 further includes a display system 512 for connecting to a display device 514. The display system 512 may comprise a video display adapter having all of the components for driving the display device, including video random access memory (VRAM), buffer, and graphics engine as desired. The display device 514 may comprise a liquid-crystal display (LCD), or may comprise alternative type of display technologies, such as a light-emitting diode (LED) display, light emitting polymer (LEP) display, gas or plasma display, or cathode ray tube (CRT) display.

A digital information appliance 500 may further include an input/output (I/O) system 516 for connecting to one or more I/O devices 518, 520 up to N number of I/O devices 522. Input/output system 516 may comprise one or more controllers or adapters for providing interface functions between one or more of I/O devices 518–522. For example, input/output system 516 may comprise a serial port, parallel port, network adapter, printer adapter, radio-frequency (RF) communications adapter, universal asynchronous receiver-transmitter (UART) port, etc., for interfacing between corresponding I/O devices 518–520 such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, and the like. The input/output (I/O) system 516 may also provide interconnection of the digital information appliance's input device 524 (e.g., input devices 130, 230, 320 & 416 of FIGS. 1 through 11) with the system bus 510.

It should be appreciated that modification or reconfiguration of the hardware architecture of the digital information appliance 500 of FIG. 13 by one having ordinary skill in the art would not depart from the scope or the spirit of the present invention.

Figure 14:
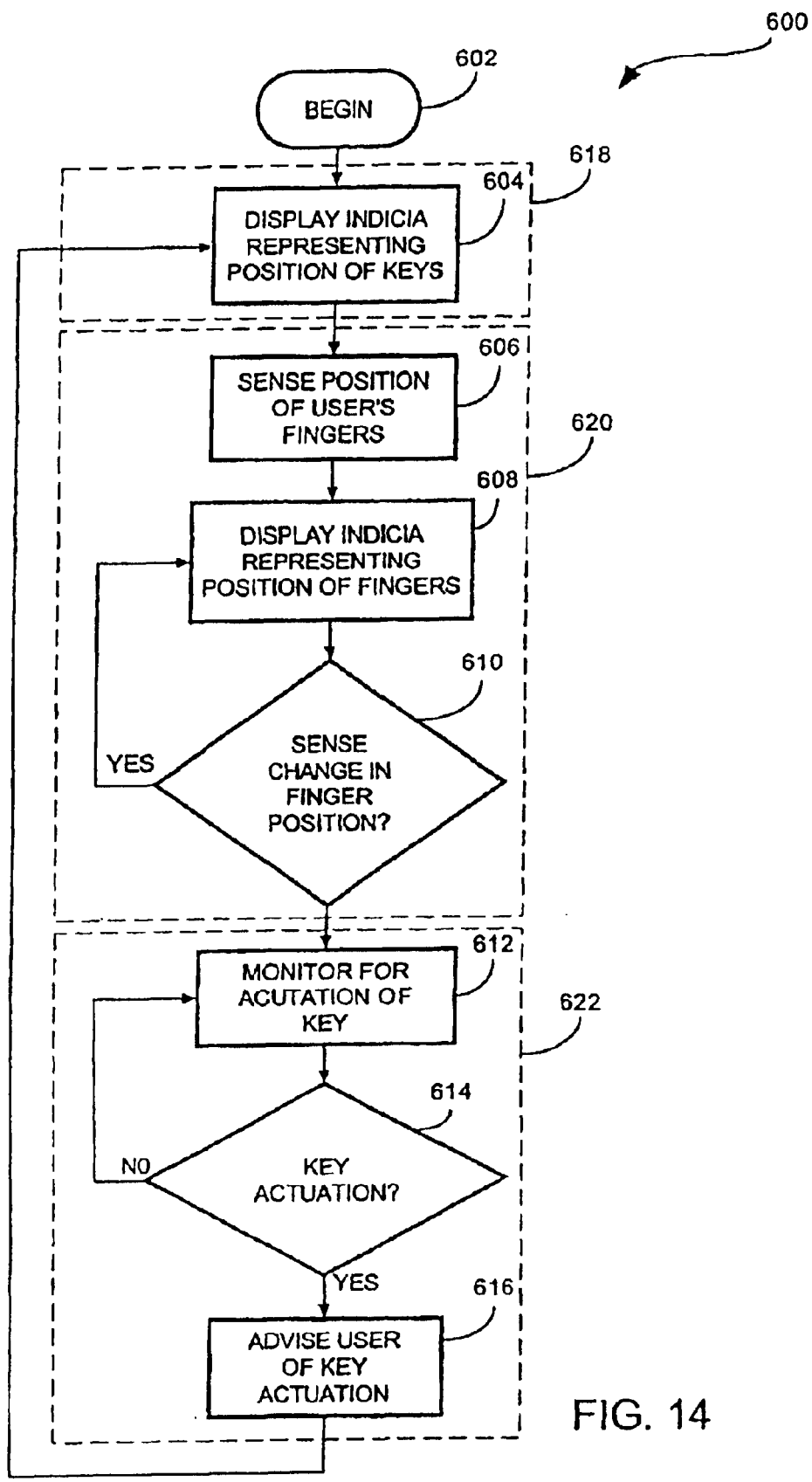
FIG. 14 is a flow diagram illustrating a method of aiding a user in entering information into the digital information appliance by displaying indicia on the display for helping locate keys of the input device.

Referring now to FIG. 14, an exemplary method for aiding a user in locating keys of the input device so the user may enter information into the digital information appliance is discussed. It is understood that the specific order, or hierarchy, disclosed in FIG. 11 is an example of one approach. Based upon design preferences, it is understood that the specific order, or hierarchy, can be rearranged while remaining within the scope of the present invention. The attached method claims present elements of the various steps in a sample order, and are not meant to be limited to the specific order or hierarchy presented.

Figure 15:
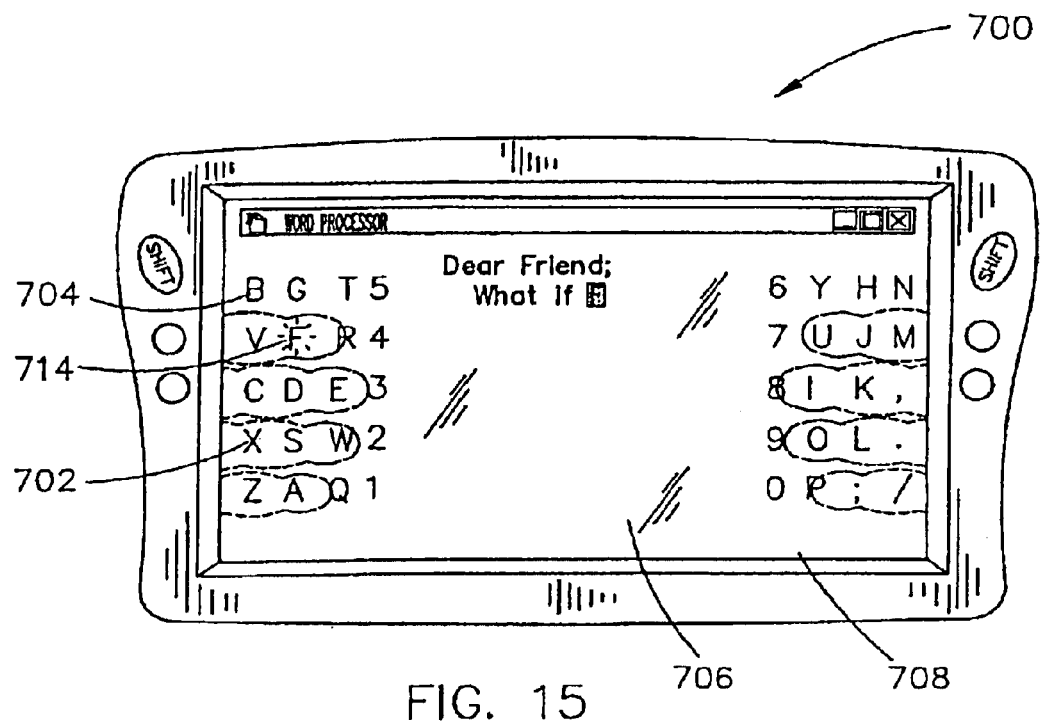
FIGS. 15 and 16 are views of a digital information appliance in accordance with an exemplary embodiment of the present invention, further illustrating lenticular or semi-transparent indicia displayed on the display for aiding the user in locating and depressing desired keys in accordance with the method illustrated in FIG. 14.
Figure 16:
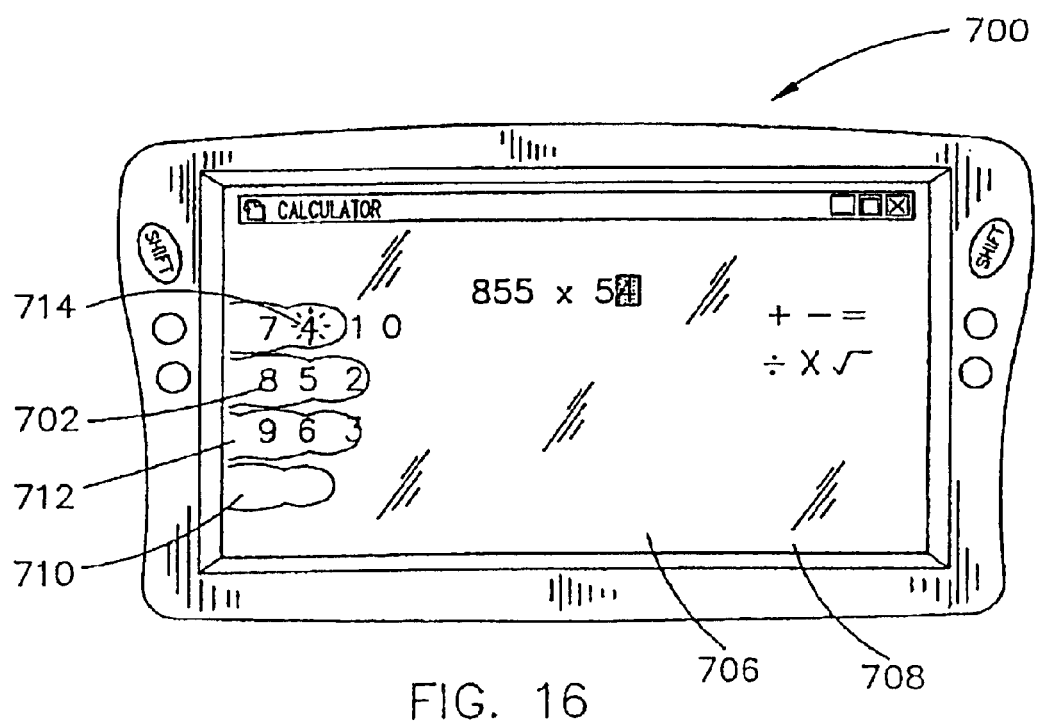

The method 600 is initiated, at step 602, wherein indicia are displayed on the display of the digital information appliance for indicating the positions of keys of the input device (e.g., a keyboard or touch sensitive panel) located on the back surface of the appliance's housing (see FIGS. 1 through 11). As shown in FIGS. 15 and 16, the digital information appliance 700 may display indicia 702 comprised of representations 704 of the keys of the input device. In an exemplary embodiment, these key representations 704 are lenticular or semi-transparent so they may be superimposed over other information 706 displayed on the appliance's display 708 while allowing the information 706 to remain viewable. Preferably, the key representations 704 are positioned within the display 708 so their location corresponds to the location on the back surface of the housing of the keys they represent. Thus, the user would see the keys of the input device as if looking though the housing of the digital information appliance 700 via an "X-ray" view. The user, viewing the indicia 702, may kinesthetically actuate or depress keys of the input device (i.e., actuate keys in response to the displayed indicia 702). Such kinesthetic key actuation may be accomplished by first locating the desired key representation 704 of the indicia 702 displayed on the display 708, positioning a finger of the hand over the expected position of the key in the input device as determined from the key representation 704, and actuating, e.g., depressing, the key.

Further, in step 602 indicia displayed on the display of the digital information appliance may interactively guide the user to select specific keys of the input device. Such indicia may, for example, aid the user in selecting only those keys that provide acceptable input to the digital information appliance in a given situation or for a given application. For example, as shown in FIGS. 15 and 16, the display attributes 714 of key representations 704 corresponding to keys which may be depressed by the user may be changed thereby indicating to the user which keys may be pressed, for example, in response to a query from an application running on the digital information appliance. Attributes 714 such as the brightness or color of the key representation 704 may be altered thereby highlighting the key representation 704 to the user. Alternately, instead of changing the key representation's attributes 714, additional indicia may be displayed on the appliance's display 708. Such indicia are preferably displayed proximally to the key representation 704. For instance, a symbol 172 (FIG. 1) such as a box, a circle, shadowing, an "X", a checkmark, etc., may be displayed over the key representation 704 to indicate its actuation. Interactive identification or illumination of keys for indicating to users which keys of an input device may be depressed in a given situation is further described in commonly owned U.S. Pat. No. 5,936,554 to Stanek, issued Aug. 10, 1999 which is herein incorporated by reference in its entirety.

Referring again to FIG. 14, in an exemplary embodiment, the digital information appliance may further sense the position of the fingers of the user's hand relative to the keys of the input device, at step 606. For example, wherein the input device is comprised of a touch sensitive panel utilizing resistive or capacitive touch pad technology, as discussed in the descriptions of FIGS. 3 and 9, the touch sensitive panel may detect the position of the user's fingers while resting on or being held in close proximity to its surface. Indicia showing the position of the user's fingers relative to the keys of the input device may then be displayed, at step 608, as part of the indicia displayed at step 602. As shown in FIGS. 15 and 16, these indicia 710 may in one embodiment be comprised of representations 712 of the user's fingers depicting the positions of the fingers relative to the keys of the input device. Preferably, the finger representations 712 are lenticular or semi-transparent and overlay the key representations 704 and other information 706 displayed on the display 708 such that the key representations 704 and information 706 remain viewable. Wherein the position of any of the user's fingers relative to the keys of the input device changes, as, for example, while typing on the keyboard, the digital information appliance may then sense the new finger position (at step 610 of FIG. 14) and alter the displayed indicia (e.g., redisplay the finger representations at step 608), accordingly.

As shown in FIG. 14, the digital information appliance may further monitor for actuation of keys of the input device, at step 612. Wherein the actuation of a key is detected at step 614, the user is advised that the key has been successfully located and actuated, at step 616. In this manner, the user may be provided feedback allowing the user to reposition the fingers of the hand over the keys of the input device if necessary (e.g., if the user determines that an unintended key was actuated). As shown in FIGS. 12 and 13, in one embodiment, the display attributes 714 of the key representation 704 corresponding to the key depressed may be changed for a predetermined period of time. For instance, attributes 714 such as the brightness or color of the key representation 704 may be altered thereby highlighting the key representation 704 to the user. Alternately, instead of changing the key representation's attributes, indicia may be displayed on the appliance's display 708 for advising the user of the key actuation. Such indicia are preferably displayed proximally to the key representation 704. For instance, a symbol 172 (FIG. 1) such as a box, a circle, shadowing, an "X", a checkmark, etc., may be displayed over the key representation 704 to indicate its actuation.

In an exemplary embodiment of the invention, key function and placement may be adapted to fit the requirements of the application being executed by the digital information appliance or the needs of the user. For instance, a user may prefer that the keys emulated by a touch sensitive panel, such as the touch sensitive panels 140 & 240 shown in FIGS. 3 and 9, be arranged in a Dvorak keyboard configuration instead of the more conventional QWERTY keyboard configuration. Alternately, the user may create a personalized key configuration or simply arrange the keys in alphabetical order. Likewise, an application executed by the digital information appliance 700 may utilize a characteristic key configuration. Such a key configuration may, for example, utilize keys having functions unique to the application. As shown in FIGS. 12 and 13, indicia 702 displayed on the display 708 may be altered to correspond to the key configuration being utilized thereby aiding the user in determining the key configuration and in locating keys of the input device. For instance, as shown in FIG. 15, wherein a word processing application is executed, a conventional QWERTY keyboard configuration may be utilized. Thus, indicia 702 employing key representations 704 arranged in a divided QWERTY keyboard (as shown in FIG. 2) may be displayed to the user. Similarly, as shown in FIG. 16, wherein a mathematics based application (e.g., a calculator application, a spreadsheet application, etc.) is executed, a calculator keypad key configuration may be utilized. Indicia 702 employing key representations 704 arranged in a calculator keypad (as shown in FIG. 8) may be displayed to the user. As discussed supra, exemplary apparatus and methods for providing configurable keyboards utilizing touch sensitive panels are described in commonly owned U.S. patent application Ser. No. 09/346,777 which is herein incorporated by reference in its entirety.

As shown in FIG. 14, the method 600 may be viewed as providing three distinct but interrelated functions: displaying indicia representing the position of keys of the input device 618, sensing and displaying finger position 620, and sensing and indicating key actuation 622. It should be appreciated that, based upon design and/or user preferences, a digital information appliance may be configured to provide none, any or all of the functions 618, 620 & 622 without departing from the scope and spirit of the present invention. For instance, in one exemplary embodiment, a digital information appliance may display indicia for indicating key position to the user (perform function 618). The digital information appliance may further sense and indicate key actuation (perform function 622). Such a digital information appliance may, however, utilize an input device comprised of a keyboard that does not sense finger position. Similarly, in another embodiment, a digital information appliance may be capable of providing all three functions 618, 620 & 622. However, a user may choose to view only key position (provided by function 618) and not finger position provided by function 620) and/or key actuation (provided by function 622).

Although the method 600 has been described with a certain degree of particularity, it should be recognized that elements thereof may be altered by persons skilled in the art without departing from the spirit and scope of the invention. In one of the embodiments of the invention, the method 600 can be implemented as sets of instructions resident in the memory 604 of one or more digital information appliances configured generally as described in FIG. 13. Until required by the digital information appliance, the set of instructions may be stored in another readable memory device, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions may be stored in the memory of an information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the method of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method of aiding a user in entering information into a digital information appliance, wherein the digital information appliance includes a display disposed on a first surface and an input device disposed on a second surface, the second surface being generally opposed to the first surface, the method comprising:

displaying an indicia on the display for representing the position on the second surface of at least one key of the input device;

sensing a position of a user's finger relative to the key prior to actuation of the key;

displaying a second indicia indicating the position of the finger;

sensing actuation of the key by the user pressing the key; and changing an attribute of the displayed indicia for indicating that the key has been actuated by the user pressing the key.

2. The method as claimed in claim 1, further comprising: sensing an actuation of the key; and displaying a second indicia on the display for indicating that the key as been actuated.

3. The method as claimed in claim 1, comprising displaying the indicia as a semi-transparent image over the display.

4. The method as claimed in claim 1, further comprising: sensing an actuation of the key for inputting data associated with the key.

5. A program of instructions storable on a medium readable by a digital information appliance having a display disposed on a first surface and an input device disposed on a second surface, the second surface being generally opposed to the first surface, for causing the digital information appliance to execute steps for aiding a user in entering information into a digital information appliance via the input device, the steps comprising:

displaying an indicia on the display for representing the position on the second surface of at least one key of the input device;

sensing a position of a user's finger relative to the key prior to actuation of the key;

displaying a second indicia indicating the position of the finger;

sensing an actuation of the key by the user pressing the key; and changing an attribute of the displayed indicia for indicating that the key as been actuated by the user pressing the key.

6. The program of instructions as claimed in claim 5, further causing the digital information appliance to execute the steps of:

sensing an actuation of the key; and advising a user of the digital information appliance that the key as been actuated.

7. The program of instructions as claimed in claim 5, further causing the digital information appliance to display the indicia as a semi-transparent image over the display.

8. The program of instructions as claimed in claim 5, further comprising:

sensing an actuation of the key for inputting data associated with the key.

9. A digital information appliance, comprising:

a housing having generally opposed first and second surfaces;

a processor disposed in said housing for executing a program of instructions on the digital information appliance;

a memory coupled to the processor for storing the program of instructions executable by the processor;

a display disposed on the first surface for displaying information to a user of the digital information appliance; and an input device disposed on the second surface for inputting information, said input device being oriented so as to be operable by the user for input of information while the user is holding said housing so said display is viewable by the user;

wherein the program of instructions configures the digital information appliance to display indicia for indicating the position of at least one key of the input device on the display to aid the user in locating the key, sense a position of a user's finger relative to the key prior to actuation of the key, display second indicia indicating the position of the finger, sense an actuation of the key and change an attribute of the displayed indicia to advise a user of the digital information appliance that the key as been actuated by a user pressing the key.

10. The digital information appliance as claimed in claim 9, wherein the input device comprises a keyboard.

11. The digital information appliance as claimed in claim 9, wherein said keyboard comprises left and right key ranges oriented so the user may type thereon in an inverted orientation while holding said housing.

12. The digital information appliance as claimed in claim 11, wherein said keyboard comprises a QWERTY key configuration and wherein keys normally typed by the right hand are positioned in the right key range and keys normally typed by the left hand are positioned in the left key range so as to be generally in the natural QWERTY position relative the user's fingers while holding said housing.

13. The digital information appliance as claimed in claim 9, further comprising at least one key disposed on at least one of the first surface and a side surface of the digital information appliance and positioned for actuation by a thumb of the user's hand.

14. The digital information appliance as claimed in claim 9, wherein said input device comprises at least one touch sensitive panel, wherein said touch sensitive panel is configured to emulate keys of a keyboard and wherein the keys are divided into left and right key ranges oriented so the user may type thereon in an inverted orientation while holding said housing.

15. The digital information appliance as claimed in claim 9, wherein the program of instructions causes the digital information appliance to display the indicia as a semi-transparent image overlaying information displayed by the display.

16. The digital information appliance as claimed in claim 9, wherein the program of instructions configures the digital information appliance to sense an actuation of the key for inputting data associated with the key.

17. A method of aiding a user in entering information into a digital information appliance, wherein the digital information appliance includes a display disposed on a first surface and a input device having at least one key disposed on a second surface, the second surface being generally opposed to the first surface, the method comprising:

displaying an indicia on the display for representing the position on the second surface of the at least one key of the input device;

sensing a position of the fingers of the hand of a user of the digital information appliance relative to the at least one key of the input device prior to actuation of the key;

displaying a representation of the fingers of the hand of the user on the display, the representation depicting the position of the fingers relative to the at least one key of the input device; sensing actuation of the key due to movement of the hand of the user; and changing an attribute of the displayed indicia for indicating that the key has been actuated.

18. The method as claimed in claim 17, further comprising:

sensing a second position of the finders of the hand of the user, the hand of the user having moved while using the input device; and altering the representation of the fingers of the hand of the user on the display to depict the second position relative to the at least one key of the input device.

19. The method as claimed in claim 17, wherein the representation of the fingers of the hand of the user is at least one of lenticular and semi-transparent and is overlayed onto a representation of the at least one key of the input device.

20. The method as claimed in claim 17, further comprising:

changing one of the function and placement of the at least one key for an application being executed by the digital information appliance.

21. A digital information appliance, comprising;

a housing having generally opposed first and second surfaces;

a processor disposed in said housing for executing a program of instructions on the digital information appliance;

a memory coupled to the processor for storing the program of instructions executable by the processor;

a display disposed on the first surface for displaying information to a user of the digital information appliance; and an input device disposed on the second surface for inputting information, said input device being oriented so as to be operable by the user for input of information while the user is holding said housing so said display is viewable by the user;

wherein the program of instructions configures the digital information appliance for:

displaying an indicia on the display for representing the position on the second surface of the at least one key of the input device;

sensing a position of the fingers of the hand of a user of the digital information appliance relative to the at least one key of the input device prior to actuation of the key;

displaying a representation of the fingers of the hand of the user on the display, the representation depicting the position of the fingers relative to the at least one key of the input device, sensing actuation of the key due to movement of the hand of the user; and changing an attribute of the displayed indicia for indicating that the key has been actuated.

22. The digital information appliance as claimed in claim 21, wherein the program of instructions further configures the digital information appliance for:

sensing a second position of the finders of the hand of the user, the hand of the user having moved while using the input device; and altering the representation of the fingers of the hand of the user on the display to depict the second position relative to the at least one key of the input device.

23. The digital information appliance as claimed in claim 21, wherein the representation of the fingers of the hand of the user is at least one of lenticular and semi-transparent and is overlayed onto a representation of the at least one key of the input device.

24. The digital information appliance as claimed in claim 21, wherein the program of instructions further configures the digital information appliance for:

changing one of the function and placement of the at least one key for an application being executed by the digital information appliance.

* * * * *